Nov. 8, 1955 P. M. HOTCHKIN 2,723,335
CLOCK CONTROLLED ELECTRIC HEATER
Filed June 21, 1952 3 Sheets-Sheet 1

INVENTOR.
PAUL M. HOTCHKIN,
BY
*O. O. Martin*
ATTORNEY.

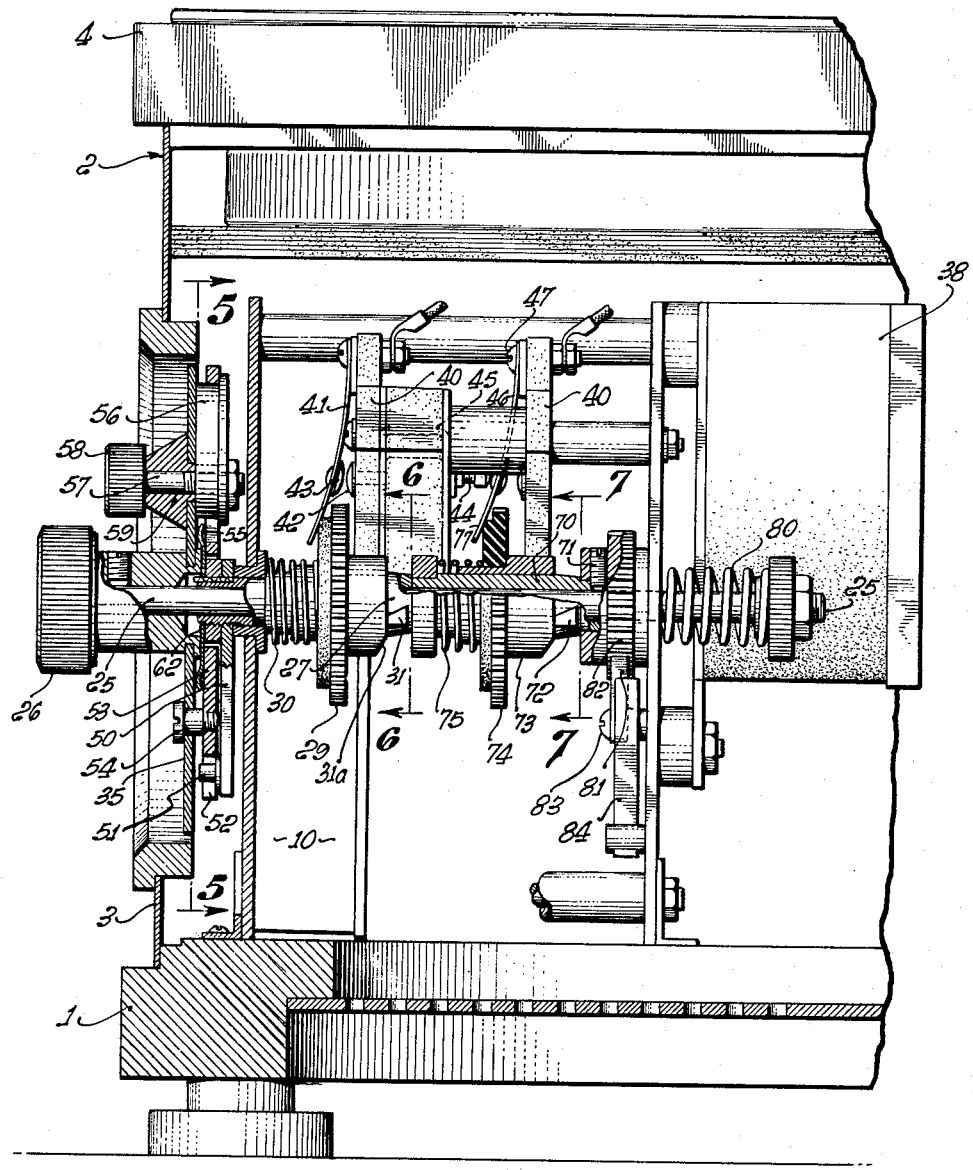

Nov. 8, 1955 — P. M. HOTCHKIN — 2,723,335
CLOCK CONTROLLED ELECTRIC HEATER
Filed June 21, 1952 — 3 Sheets-Sheet 3
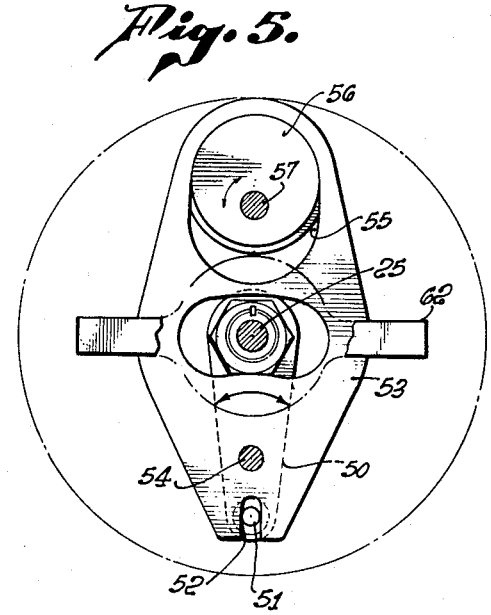
Fig. 5.
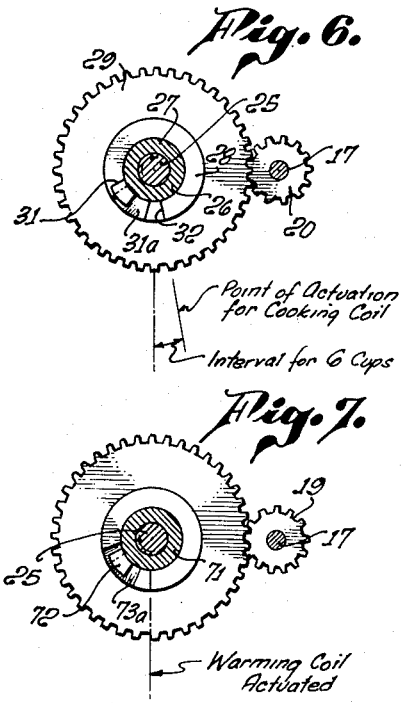
Fig. 6.
Point of Actuation for Cooking Coil
Interval for 6 Cups
Fig. 7.
Warming Coil Activated
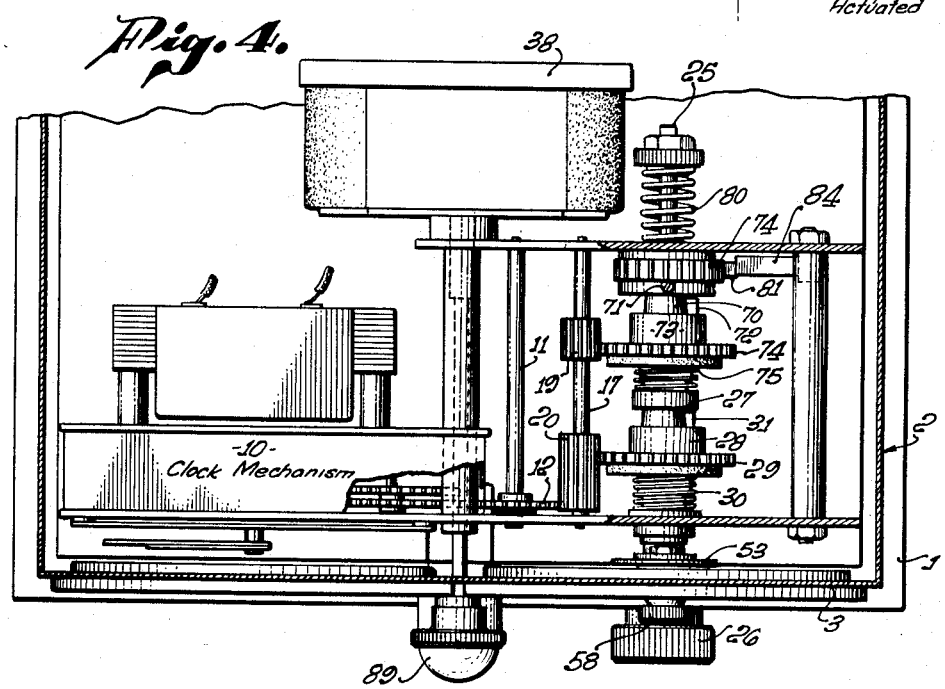
Fig. 4.
INVENTOR.
PAUL M. HOTCHKIN,
BY
ATTORNEY.

United States Patent Office 2,723,335
Patented Nov. 8, 1955

2,723,335

CLOCK CONTROLLED ELECTRIC HEATER

Paul M. Hotchkin, Burbank, Calif.

Application June 21, 1952, Serial No. 294,888

9 Claims. (Cl. 219—20)

This invention relates to electrically operated means for heating liquids and has particular reference to a clock-controlled coffee making device.

Many people like to have their coffee ready and freshly made when it is time to awake in the morning and to coffee drinking people who allow themselves very little time to get dressed and ready for the activities of the day, it is of great benefit to have the freshly made coffee standing ready to enjoy while dressing or in what short time is available before or after dressing.

It is in view of the foregoing the object of my invention to provide a clock-controlled device which will not only automatically have perfectly brewed coffee ready to enjoy at any predetermined time but which will also maintain the coffee at the proper temperature over a specified period of time.

It has been my experience that, where the heat employed for the coffee making remains constant, the time required to produce a perfect brew varies with the quantity to be made. It is in view of this a further object of the invention to provide a coffee making device which not only is pre-set to furnish coffee at a specified time but which may be set in advance for correct timing of the heating period relative to the quantity of coffee to be made.

These and other objects of the invention as well as the advantageous features thereof will become apparent upon perusal of the following detailed description and by referring to the accompanying drawings in which a preferred form of the invention is illustrated.

In the drawings:

Fig. 3 is a sectional side elevational view taken substantially on line 3—3 of Fig. 1 in the direction of the arrow;

Fig. 4 is a sectional plan view taken on line 4—4 of Fig. 1;

Fig. 5 is a detail view of a portion of the time-controlling mechanism of the invention;

Figs. 6 and 7 illustrate details of circuit-controlling devices of the invention.

Figure 1:
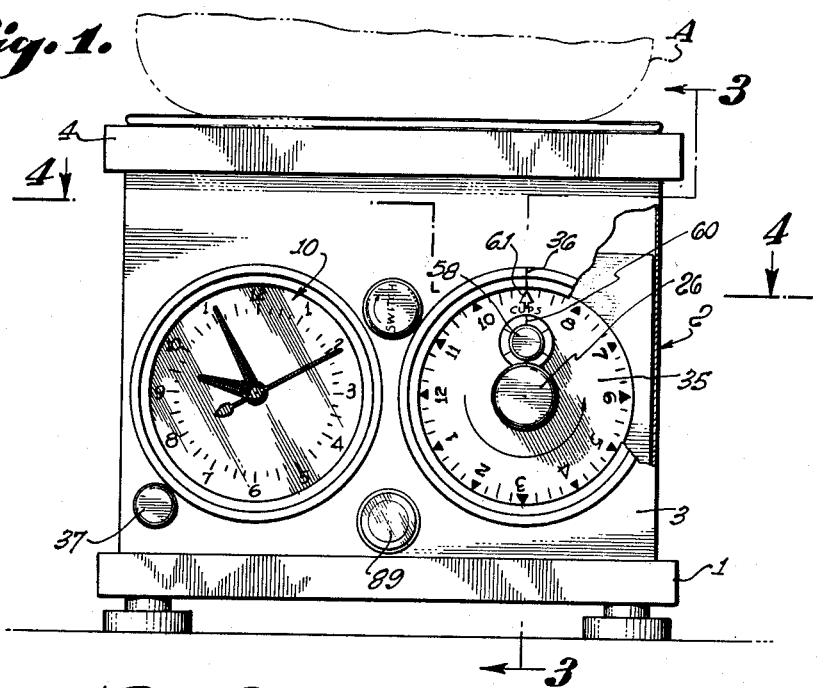
Fig. 1 is a front elevational view of a coffee-making device embodying the invention.
Figure 2:
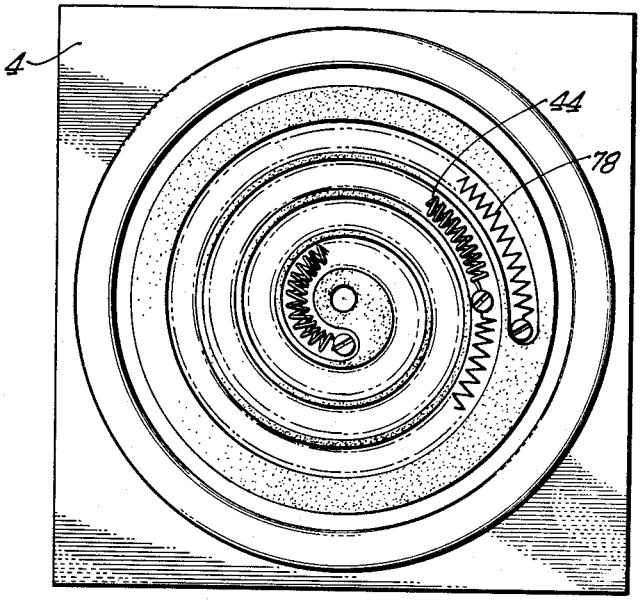
Fig. 2 is a substantially corresponding plan view of the device.

The device of the invention in the form illustrated in the drawings, is mounted on a base 1, within a rectangular casing 2, the front plate 3 of which in Fig. 1 has been broken away in order more clearly to show the dials and other elements by means of which the operation of the device is controlled.

Above the casing is mounted a top plate 4 in which the heat elements of the device are seated for operation in the manner which will be hereinafter more fully described and to support thereon a coffee pot A or other container for a liquid to be heated.

As shown in Fig. 4, the numeral 10 denotes an electric clock mechanism of any suitable design, on a shaft 11 of which a gear wheel 12 is rigidly mounted to impart movement to the various instrumentalities of the invention in the maner which will now be described.

Parallel with this shaft and spaced away therefrom a distance is another shaft 17, on which are mounted wide gear pinions 19, 20. A third shaft 25, to the front end of which is affixed a knob 26 is placed in parallel relation to shafts 11 and 17. A sleeve 27 is mounted for rotation on this shaft 25 and it is by means of mechanism which will be described later connected for rotative adjustment on this shaft. A collar 28 rides on this sleeve and a gear wheel 29 is rigidly mounted on this collar in position to engage the teeth of the gear pinion 20 which, while the clock is in motion, continuously rotates the gear and collar. A spring 30 urges the collar against a stud or dog 31 which latter projects radially from the surface of the sleeve 27. Into the inner end surface of the collar, at one side of the passage therethrough, is sunk a recess 32 of a size to receive therein the stud 31 at the time the rotating collar reaches the position at which the recess and stud become axially alined. The spring 30 is now free to push the collar axially along the sleeve until the stud is completely seated in the recess. The pinion 20 is wide enough to retain the gears in mesh in both positions.

On a bracket 40 is mounted a resilient contact element 41, the outer free end of which bears against and is maintained under tension by side surface of the hub of the gear 29. When the gear is moved axially by the spring 30, as above described, it is found that the resilience of this element causes it to follow this movement of the gear and so to close a circuit through contacts 42, 43 of the element and the bracket. The gear 29 and the bracket are, for this purpose, made from dielectric material. Into this circuit is cut a heating element 44 at the top of the casing 2. This element now becomes energized to heat the water in the pot A.

The mechanism of the device is so designed that one manual revolution of the shaft 25 represents twelve hours of clock timing. A dial 35 is shown secured to knob 26 of the shaft and this dial is graduated to show the twelve hour divisions of the clock dial and fifteen minute intervals therebetween. On the front plate 3, above this dial, is a graduation, or set mark 36 by means of which the dial may be set, upon rotation thereof, to indicate the time at which the operation of the heating element will be discontinued. And since rotation of the dial imparts rotation to the shaft 25, it is found that the stud 31 is brought into a position representing time required for the rotating gear 29 to move the recess 30 into axial alinement with the stud. A knob 37 projects from the front of the casing and this knob is in any convential manner connected to set the clock to correspond to the setting of the dial. A master switch 38 is cut into the circuit of the heating coil 44 and when this switch is closed at the time the dial is set, it is found that the heating element will become energized at the time the stud 31 and recess 32 are fully engaged. It is now noticed that one side surface of the recess 32 is cut back to form a cam which, upon continued rotation of the collar 28 engages the inclined cam surface 31ᵃ of the stud gradually to impart axial return movement to the collar and so to return the contact element 41 to its initial position at the end of the period required for making the coffee.

Since, as above mentioned, the time required for the coffee making varies with the quantity to be made, it becomes necessary to provide means for adjusting the mechanism to provide the correct timing. The device illustrated in the drawing is designed to serve the popular two, four and six cup capacity coffee pot and I have found that with a current of about 550 watts, it requires twenty minutes to make six cups of coffee, commencing with the water at room temperature, fifteen minutes to make four and ten minutes to make two cups. In other words, it requires an additional two and one-half minute period for each additional cup of coffee to be made. It was above stated that the dial 35 is made with fifteen minute graduations, which means that the dial would have to be turned one-sixth of the space between the fifteen minute graduations to effect the change from one cup setting to another. This is far too close an adjustment for the user to attempt and it becomes necessary to provide coarser adjustment. This may be done in the following manner.

An arm 50 is rigidly secured to the front end of the sleeve 27 and a stud 51 at the outer end of this arm rides in a slot 52 of a lever 53 which, at 54, is shown pivotally hung on the rear surface of the dial 35. In the upper end of the lever is cut an elongated perforation 55 of a size to receive therein a cam 56 and this cam is rigidly secured to a short stub shaft 57 extending through the dial. A knurled knob 58 is placed on the outer end of this stub shaft and this knob may be manually turned, right and left, within the limits of movement of the cam within the perforation 55, to rock the lever 53 on its pivot 54, whereby to swing the arm 50 back and forth and so to impart rotation to the sleeve 27.

Upon closer examination of Fig. 5 of the drawings, it is noticed that the lever 53 is so proportioned and placed that a relatively extensive oscillation of the upper end of the lever is translated into a very limited oscillation of the pin 51 of the arm 50 at the lower end thereof. And this finer oscillation is so greatly reduced through the arm 50 that the right and left rotation of the knob 58 imparts a rotation to the shaft 25 corresponding to the two and one-half minute variation of the coffee making period. The knob 58 is at the inner end thereof fitted with an enlarged base 59 into which is sunk a graduation 60. This graduation corresponds to the central position of the cam 56 within the perforation 55. It follows that the correct time period for making four cups of coffee is established when this graduation is moved into registration with a graduation 61 of the dial directly above the center thereof. Rotation of the knob, right or left, within its limits of movement, will set the mechanism for two or six cup periods. Intermediate graduations are added to set the timing for three and five cups. A resilient plate 62 is placed between the lever 53 and the rear surface of the dial 35 by pressure against the lever to apply sufficient friction to take up all slack between the parts and so to insure correct and unchanging setting of this timing.

It was above stated that one of the objects of the invention is to provide means for maintaining the temperature of the heated liquid unchanged over a period of time after the coffee making has been completed. For this purpose, I have shown a second sleeve 70 mounted on the shaft 25 nearer the rear end thereof and and this sleeve is by a set screw 71 rigidly locked in position thereon. A stud 72 projects from this sleeve and this stud and the stud 31 are similarly shaped and proportioned. A collar 73 supports a gear 74 in position to engage the pinion 19 and these parts may be substantial duplicates of the collar 28 and gear 29. A spring 75 urges movement of the collar to interengage the stud with the recess 73a of the collar, thereby to permit the contact element 77 to close a circuit through a warming coil 78. The position of the stud 72 relative to the stud 31, circumferentially, is so that the heating of the liquid is commenced before the stud 72 reaches the position of alinement with the recess 73a of the collar and since the warming period is considerably longer than the heating period, it becomes necessary correspondingly to increase the width of the recess 73a of the collar.

The timing of the various operations is so important and the movements of the parts to produce the correct timing so slight that it becomes necessary to maintain shaft 25 unturned in adjusted position during the operation of the device. It has for this reason been found advantageous to place a compression spring 80 on the rear end of the shaft. The tension of this spring will apply sufficient friction to the shaft to resist the pressure of the cam surface 73a of recess 73 against the cam surface of the stud 72, tending to rotate the shaft. It is also necessary to provide means for preventing rotation of the shaft in the opposite direction and I have for this purpose shown a ratchet wheel 82 mounted on the sleeve 70. A pawl 81 is at 83 shown hung for rotation on the rear wall 16 of the casing in position to engage the teeth of the ratchet wheel and a spring 84 urges this pawl into engagement with the teeth of the wheel.

Figure 8:
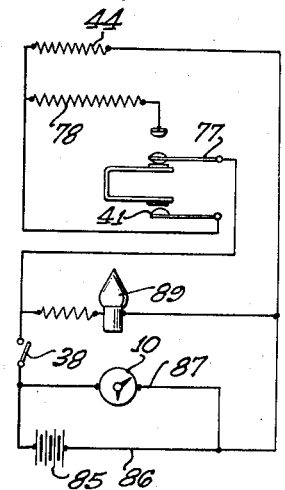
Fig. 8 is a diagrammatic outline of the electrical connections of the device.

In the wiring diagram of Fig. 8, a circuit from a source of energy 85 is closed through conduits 86, 87 and the clock 10. The conduit 86 extends through the heating coil 44 to the contact element 41. When the gear 29 is moved axially, as above described, to release this element, the current is free to flow through the contact element 77 and the master switch 38 back to its source. This circuit remains closed for the period required to effect the heating of the liquid, at the end of which time the gear 74 is moved axially to permit the contact element 77 to move, thereby to close the circuit through both the heating and the warming coils. But while the element 41 returns to its initial position at the end of the heating period, it is seen that the circuit through both coils remains closed to the end of the warming period when return movement of the element 77 opens the circuit.

It is also to be noted that a pilot lamp 89 is cut into the circuit and that this lamp becomes ignited when the master switch is closed, to remain ignited until this switch again is opened.

It is seen from the foregoing that I have provided a coffee making device which will have a predetermined amount of coffffee finished and perfectly brewed at any desired preset time. Also that the temperature of this brew of coffee will remain unchanged for a desired, predetermined period of time. But while I have shown and described a preferred form of the invention, I do not thereby intend to be limited to the arrangements and proportions exactly as illustrated and described but reserve the right to embody modifications therein within the scope of the claims hereto appended.

I claim:

1. An electrically operated time controlled coffee maker comprising, an electric clock in a circuit, heating and warming element circuits extending from said clock circuit, devices continuously rotated by said clock first to close the heating element circuit, second to close the warming element circuit, third to maintain both elements energized for a predetermined period of time, fourth to open the heating element circuit, and fifth to open the warming element circuit.

2. An electrically operated time controlled coffee maker comprising, an electric clock in a circuit, heating and warming element circuits extending from said clock circuit, devices continuously rotated by said clock first to close the heating element circuit, second to close the warming element circuit, third to maintain both elements energized for a predetermined period of time, fourth to open the heating element circuit, fifth to open the warming element circuit, means for adjusting said devices to start the operations thereof after predetermined periods of time, and means for determining the period of time for each operation.

3. An electrically operated time-controlled coffee maker comprising, a normally open circuit, a heating element in the circuit, a warming element in the circuit, an electric clock, devices continuously rotatable by said clock to close the circuit through said heating element, similar devices continuously rotatable by the clock subsequently to close the circuit through said warming element and to maintain both elements energized for a predetermined period of time, manually settable means for determining the relative periods of operation of said devices, and manually operable means for adjusting said manually settable means to vary the period of operation of said heating element after the circuit through the heating element has been closed by the first named devices and until the circuit through the warming element is closed.

4. An electrically operated time-controlled coffee maker comprising, a normally open circuit, a heating element in the circuit, a warming element in the circuit, an electric clock, a shaft, sleeves on the shaft having projections thereon, circuit closing devices rotatable on said sleeves and connected for continuous rotation by the clock, said devices having recesses therein for registration with said projections, manually operable means for adjusting the devices to determine the periods of rotation required to move the recesses of the devices into alinement with the sleeve projections, and spring means urging axial movement of the devices to cause the recesses thereof to engage the adjacent sleeve projections and in so moving to close the circuit through said heating element and subsequently to close the circuit through the warming element, continued rotation of the devices breaking the circuit through the heating element and subsequently through the warming element.

5. An electrically operated time-controlled coffee maker comprising, a normally open circuit, a heating element in the circuit, a warming element in the circuit, an electric clock, a shaft, sleeves on the shaft having projections thereon, circuit closing devices rotatable on said sleeves and connected for rotation by the clock, said devices having recesses therein for registration with said projections, manually settable means for determining the periods of operation of the devices to move the recesses thereof into alinement with the projections, spring means using axial movement of the devices to cause the recesses thereof to engage the adjacent sleeve projections and in moving to close the circuit through said heating element and subsequently the circuit through the warming element and manually settable means for determining the periods of operation of said devices required to close and again to open the circuits.

6. An electrically operated time-controlled coffee maker comprising, a normally open circuit, a master switch in the circuit, a heating element in the circuit, a warming element in the circuit, an electric clock, a shaft, sleeves on said shaft having projections thereon, circuit closing devices rotatable on said sleeves and connected for rotation by the clock, said devices having recesses therein for registration with said projections, manually settable means for determining the periods of operation of the devices to move the recesses thereof into alinement with the projections, spring means urging axial movement of the devices to cause the recesses thereof to engage the adjacent shaft projections in moving to close the circuit through said heating element and subsequently to close the circuit through the warming element and to reopen the heating element circuit, manually settable means for determining the periods of operation of said devices, and manually operable means for adjusting the period of operation of the devices and to reopen the circuit through the warming element.

7. An electrically operated time-controlled coffee maker comprising, a normally open circuit, a heating element in the circuit, a warming element in the circuit, an electric clock, a shaft having a projection thereon, a sleeve on the shaft having a projection thereon, circuit closing devices mounted for rotation on said shaft and sleeve and continuously rotated by said clock, said devices having recesses therein for registration with the shaft and sleeve projections, means urging the devices into engagement therewith, and a manually rotatable dial rigid on the shaft, said dial having thereon graduations corresponding to the clock graduations, the dial being connected to rotate the shaft and sleeve to adjust the angular positions of the projections thereof first to cause the recess of the device on the sleeve to move into registration with the sleeve projection at the time chosen for making the coffee and subsequently to cause the device on the shaft to move into registration with the shaft projection, continued rotation of the devices causing the sleeve projection and subsequently the shaft projection to move the devices out of engagement therewith thereby to open the circuit through the elements.

8. An electrically operated time-controlled coffee maker comprising, a normally open circuit, a heating element in the circuit, a warming element in the circuit, an electric clock, a shaft having a projection thereon, a sleeve on the shaft having a projection thereon, circuit closing devices mounted for rotation on said shaft and sleeve and continuously rotated by said clock, said devices having recesses therein for registration with the shaft and sleeve projections, means urging the devices into engagement therewith, a manually rotatable dial having thereon graduations corresponding to the clock graduations, said dial being connected to rotate the shaft and sleeve to adjust the angular position of the sleeve projection first to cause the recess of the device thereon to move into registration with the sleeve projection at the time chosen for making the coffee and subsequently to cause the device on the shaft to move into registration with the shaft projection, continued rotation of the devices causing the sleeve projection and subsequently the shaft projection to move the devices out of engagement therewith thereby to open the circuit through the elements, and manually operable means on the dial for varying the extent of angular adjustment of the sleeve projection.

9. An electric clock-controlled coffee making device comprising, an electric clock circuit, heating and warming elements in normally open circuits extending from said clock circuit, switches operable to close and again to open said element circuits, a shaft, a sleeve on said shaft in adjustable relation thereto, said shaft and sleeve having separate rotative calibrated dials and knobs connected to their outer ends and projections fixed near their inner ends, axially slidable collars on said sleeve and shaft continuously rotated by said clock and having recesses in their outer faces to engage said projections to close said element switches when so engaged; springs urging the collar recesses into engagement with said projections, cams associated with said recesses to return the collars and switches to normal open positions, and marks on the device associated with said dials for manually adjusting the device to the desired timing.

References Cited in the file of this patent

UNITED STATES PATENTS

| | | |
|---|---|---|
| 1,852,102 | Bast et al. | Apr. 5, 1932 |
| 2,145,082 | Gratson | Jan. 24, 1939 |
| 2,268,737 | Brown | Jan. 6, 1942 |
| 2,295,298 | Sharp | Sept. 8, 1942 |
| 2,392,166 | Lockwood | Jan. 1, 1946 |
| 2,434,471 | Rhodes | Jan. 13, 1948 |
| 2,451,069 | Candor | Oct. 12, 1948 |
| 2,509,693 | Morrison | May 30, 1950 |
| 2,606,991 | Candor | Aug. 12, 1952 |
| 2,610,284 | Kolisch | Sept. 9, 1952 |